A. MULL.
WHEEL PROTECTOR.
APPLICATION FILED SEPT. 14, 1920.

1,381,583.

Patented June 14, 1921.
2 SHEETS—SHEET 1.

Inventor
Arthur Mull.
By
Attorneys

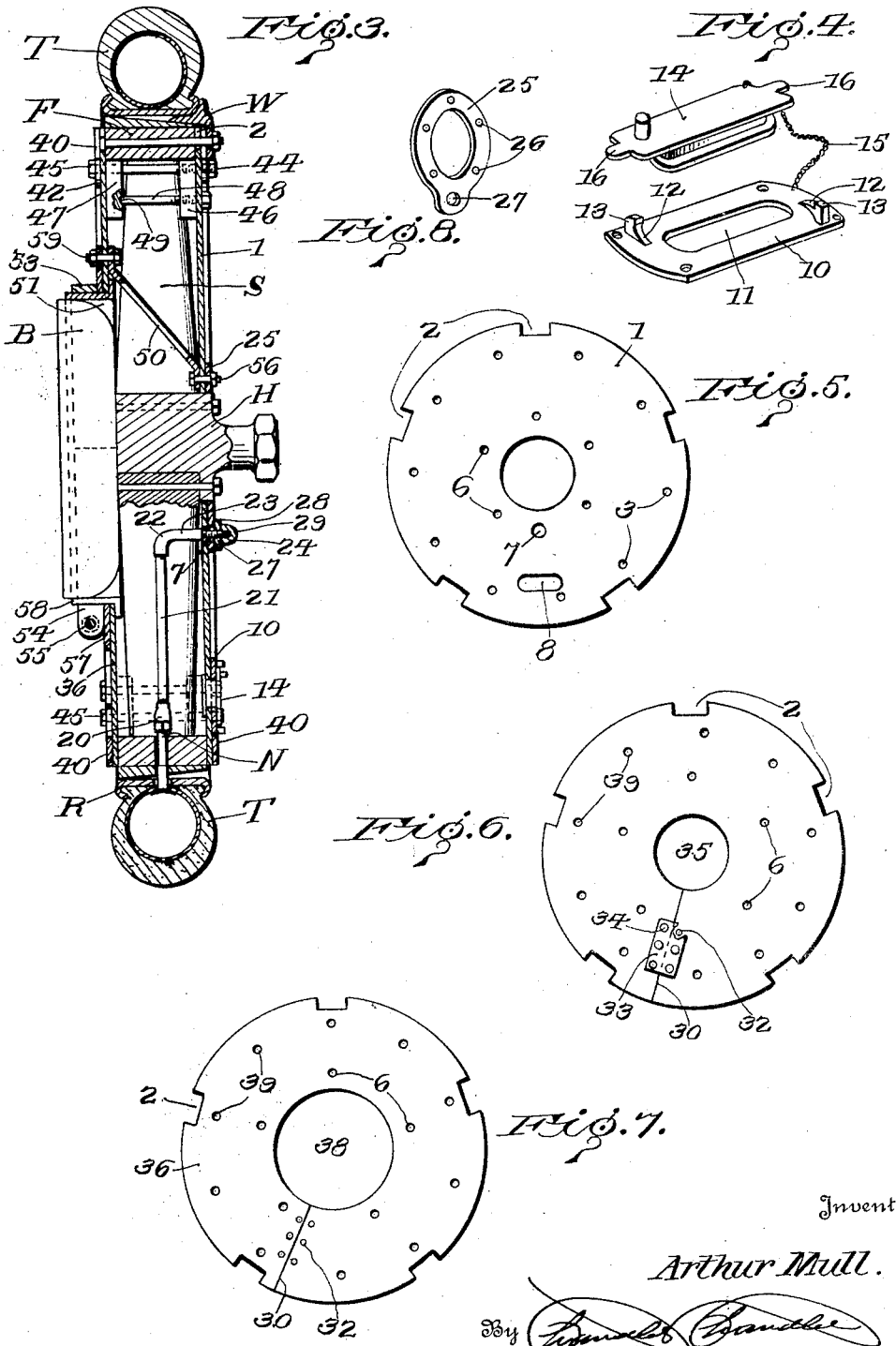

UNITED STATES PATENT OFFICE.

ARTHUR MULL, OF CHICAGO, ILLINOIS.

WHEEL-PROTECTOR.

1,381,583. Specification of Letters Patent. Patented June 14, 1921.

Application filed September 14, 1920. Serial No. 410,115.

*To all whom it may concern:*

Be it known that I, ARTHUR MULL, a citizen of the United States, residing at Chicago, in the county of Cook, State of Illinois, have invented certain new and useful Improvements in Wheel-Protectors; and I do hereby declare the following to be a full, clear, and exact description of the invention, such as will enable others skilled in the art to which it appertains to make and use the same.

This invention relates to motor vehicles, and more especially to the wheels thereof; and the object of the same is to produce a set of protector plates for application to the outside and inside of all the wheels.

The invention contemplates details of construction adapting the plates for attachment to wheels of various makes, and preferably to those having demountable rims. One feature is the special construction by which the inner plates of the rear wheels are fastened around the brake drum box. Another feature is the means for extending the air nipple radially inward and carrying it axially outward through the outer plate, while yet providing means in this plate whereby the nipple may be reached. Another feature is the provision of means whereby the inner plates can be applied to the wheels without removing them from the axles. Details are set forth below and shown in the drawings wherein:

Fig. 3 is a vertical sectional view through the rear wheel in the plane of the nipple extension, the nipple and the extension being shown in elevation.

Fig. 4 is a detail of the plate and button for permitting access to the nipple.

Fig. 5 is an elevation on a reduced scale, showing the construction of the outside plate for either wheel, and Fig. 6 is a similar elevation of the inside plate for the front wheel, while Fig. 7 is a similar view of the inside plate for the rear wheel.

Fig. 8 is a perspective detail of the ring for application outside the plate to receive the air valve extension pipe.

Figure 1:
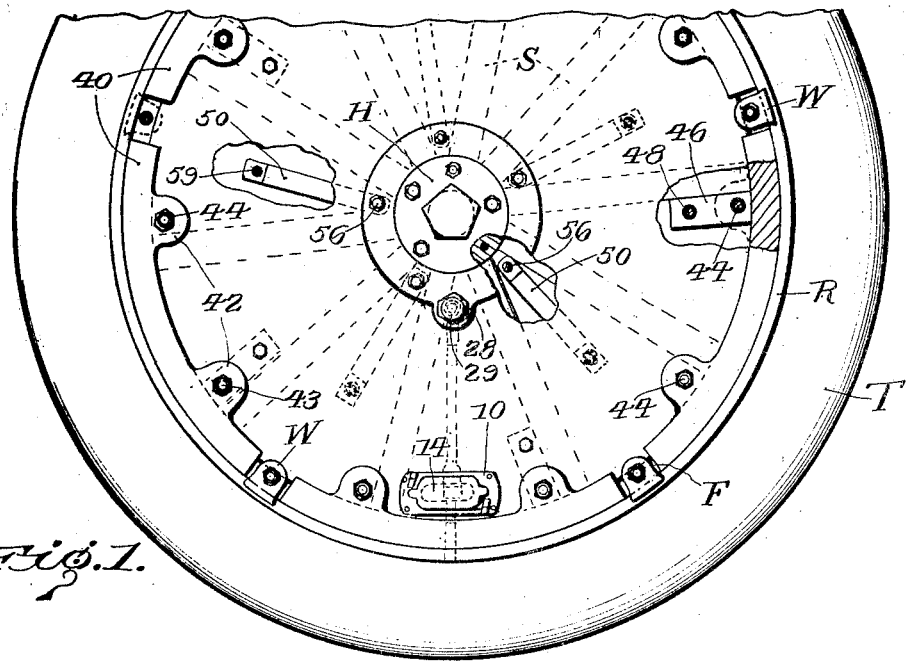
Figure 1 is an elevation of a considerable portion of a wheel equipped with these plates, viewing the wheel from the outside, and with certain parts broken away.
Figure 2:
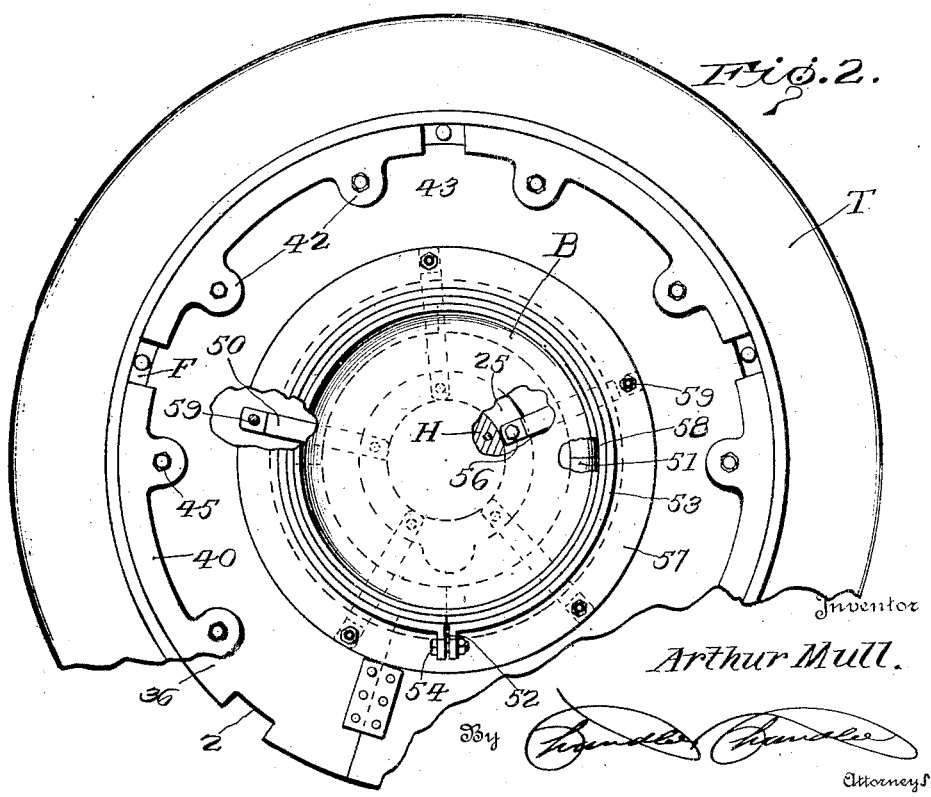
Fig. 2 is a similar view taken from the inside of the rear wheel.

The usual motor vehicle wheel comprises a hub H from which spokes S radiate to a felly F, and around the latter by means of wedges W and their fastening bolts is secured the demountable rim R carrying the tire T. Each rear wheel in addition carries at its inner side a brake drum box B which causes this side of the rear wheels to differ somewhat from the corresponding side of the front wheels, although on their outer sides we may assume that they are alike. This improved protector includes plates or disks for application to the outer and inner sides of all wheels, and means for attaching them thereto.

Coming now to the present invention, the numeral 1 designates the outer plate (see Fig. 5) or disk having notches 2 in its periphery for receiving the rim fastening devices W, a series of bolt holes 3 near said periphery, a central hub opening 5 with a series of bolt holes 6 around it, an offset hole 7, and an opening 8 at a proper point to come opposite the air nipple N.

As seen in Fig. 4, a plate 10 may be secured over the opening 8, the plate itself having an opening 11 and wedges 12 and stops 13 on its exterior; and a cap plate or button 14 connected by a chain 15 with this plate is adapted to be inserted in the opening 11 and turned so that its extremities 16 ride up the wedges against the stops to hold it in closed position. When access to the nipple N is desired, this button is turned in the opposite direction by the operator who may then reach through the opening 11 in the plate 10. However, any appropriate form of removable closure for the nipple opening 8 in the outer plate 1 may be provided.

Referring now to Fig. 3, the plunger is taken out of the air valve or nipple N and a swivel coupling 20 screwed onto it, the coupling receiving a pipe 21 leading inward toward the hub, through an elbow 22, and then extending axially as at 23 through the offset hole 7 in the plate 1, reduced at its outer end as at 24, and receiving a nut 28 and cap 29. However, a ring 25 is applied to the outer face of the plate 1, this ring having holes 26 registering with those numbered 6 in the plate and by which it may be attached thereto by means of screws or bolts, and the ring has an offset hole 27 registering with the hole 7 in the plate so that the reduced end 24 of the extension pipe may pass through both holes and receive the nut and cap. When it is desired to inflate the tire, the cap is removed and the pump applied to the reduced extremity. When a tire must be taken off, the button is turned aside and the operator reaches in and unscrews the coupling 20 from the nipple N and runs it up on the pipe 21, and after the new tire has been put on, the coupling is connected with its nipple as just described.

The inside plate 31 for the front wheel (see Fig. 6) has the same notches and outer and inner holes, but it is split radially at 30 from its hub opening 35 so that it may be passed over the axle and applied to the inner side of the wheel without necessarily removing the wheel. Alongside said split are holes 32, and fastening plates 33 may be laid across the split and bolts 34 passed through the plates and the holes 32 to hold the split ends of the wheel plate together. One of the fastening plates 33 is shown in Fig. 6, but not in Fig. 7; this detail may be omitted entirely, leaving through bolts to perform its service.

The construction of the inside plate 36 for the rear wheel (see Fig. 7) is substantially the same as that for the front wheel except that its central opening 38 is considerably larger because it must surround the box B, and around its opening by preference is a series of holes 39.

In the application of a pair of plates to a front wheel, through bolts are passed through holes 26 in the ring 25, and the inner series of holes 6 in the two plates, between which latter these bolts pass between spokes as will be clear, and the washers and nuts are applied to their inner ends. Arcuate jaws 40 are provided, preferably about five in number, each a little shorter than one-fifth of the distance around the felly so that the rim fastening devices W may project between the ends of contiguous jaws. Each jaw has ears 42 pierced with holes 43 at points to register with the holes 3 around the outer and inner plates, and through bolts 44 are passed through these ears and the plates and between the spokes as will be understood, and nuts 45 applied to their inner ends. As seen at the top of Fig. 3, however, blocks 46 and 47 are strung on the bolts 44 between the plates and next inside the felly of the rear wheel, and a screw 48 is passed through the outer plate and the outer block and engaged with a socket 49 in the inner block.

While the bolts closely surrounding the hub of the front wheel pass straight through the outer and inner plates, the corresponding bolts on a rear wheel cannot do so because of the brake drum box B which rigidly surrounds the inner end of the hub. Therefore angular braces 50 are made use of, their radially inner ends lying inside the outer plate 31 and connected with it by short bolts 56 passing through the holes 6 and 26, and their radially outer ends standing inside the inner plates and connected therewith by short bolts 59 passing through the holes 39. Around the box B is placed a wedge ring made in sections whereof each is shaped as shown at 51, around this ring is placed a flanged collar 58 split as at 52, around this collar is placed a clamping ring 53 split as at 54 and its ends turned outward and drawn together by a bolt 55, and the clamping ring may hold another ring 57 against the plate and this plate against the flange of the collar as seen in Fig. 3.

In applying this structure to the wheels, it may be well first to attach the extension nipple whose details have been fully described. Then the inner and outer plates of the front wheels are applied, the ring 25 over the outer plate and with the reduced end 24 of the pipe projecting through its hole 27 and held by the nut 28, and finally the jaws and the through bolts. In applying a pair of plates to a rear wheel the extension nipple should also first be attached, and then the wedge sections and clamp, the inner plate and braces, the outer plate, the jaws, and the through bolts 44. The screws 48 may be set up tight last to strain the blocks 46 and 47 apart and prevent rattle. Thus the spokes and the felly are completely inclosed, yet the structure is such that the rim and its tire may be readily demounted. It is the intention to make these plates in sizes to fit wheels of different sizes; but it is quite possible that having selected a pair of plates of the proper size, they may be fitted to wheels of a variety of patterns.

What is claimed is:

1. In a wheel protector, the combination with plates for application to the outside and inside of a wheel and notched in their edges to admit the rim-fastening devices; of jaws overlying the edges of the plates and spaced at their ends to admit said devices, and through bolts passing through the jaws and the plates and between the spokes of the wheel.

2. In a wheel protector, the combination with plates for application to the outside and inside of a wheel and notched in their edges to admit the rim-fastening devices; of jaws overlying the edges of the plates and spaced at their ends to admit said devices, blocks between said plates standing just inside the wheel felly, through bolts through the jaws and blocks and plates, and screws through the jaw and plate and block at one side of the wheel and against the block at the other side.

3. A protector for wheels comprising spaced disks having central openings to receive the opposite end portions of a wheel hub, means at the peripheries of the disks for drawing them into clamping relation to a wheel felly therebetween, means adjacent the central openings of the disks for holding them in spaced relation at their inner edges, and means disposed between the drawing means and holding means for stressing the disks apart, whereby to place them under tension and prevent rattling.

4. A protector for wheels comprising disks having central openings of different diameters to receive a wheel hub and brake drum respectively, diagonal braces connecting the disks adjacent their openings, means at the outer peripheries of the disks for drawing them together to clamp a wheel felly therebetween and means between the drawing means and the braces for tensioning the disks.

In testimony whereof, I affix my signature, in the presence of two witnesses.

ARTHUR MULL.

Witnesses:
Mrs. A. MULL,
M. A. SCHALLER.